United States Patent
Seshan et al.

(10) Patent No.: US 6,914,658 B2
(45) Date of Patent: Jul. 5, 2005

(54) METHOD FOR FABRICATING A MOAT AROUND AN ACTIVE PIXEL AREA OF A MICROELECTRONIC IMAGE PROJECTION DEVICE

(75) Inventors: Krishna Seshan, San Jose, CA (US); Chaoyang Li, San Jose, CA (US); Geoffery L. Bakker, San Jose, CA (US); Lawrence Dass, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 10/330,931

(22) Filed: Dec. 26, 2002

(65) Prior Publication Data

US 2004/0125247 A1 Jul. 1, 2004

(51) Int. Cl.⁷ .......................................... G02F 1/1339
(52) U.S. Cl. ...................... 349/153; 349/156; 349/160; 349/190
(58) Field of Search ............................... 349/153, 154, 349/156, 160, 187, 189, 190

(56) References Cited

U.S. PATENT DOCUMENTS

| | | | | | |
|---|---|---|---|---|---|
| 5,550,604 A | * | 8/1996 | Gale et al. | ..................... | 353/31 |
| 5,557,436 A | * | 9/1996 | Blose et al. | ................. | 349/153 |
| 5,831,710 A | * | 11/1998 | Colgan et al. | ............... | 349/156 |
| 5,851,423 A | * | 12/1998 | Teng et al. | ............... | 252/299.1 |
| 6,018,380 A | * | 1/2000 | Hu et al. | ..................... | 349/153 |
| 6,348,959 B1 | * | 2/2002 | Melnick et al. | ............. | 349/110 |
| 6,498,635 B1 | * | 12/2002 | Jie et al. | ..................... | 349/156 |
| 6,614,491 B2 | * | 9/2003 | Hasegawa et al. | ............ | 349/37 |
| 2003/0076461 A1 | * | 4/2003 | Liu et al. | ..................... | 349/113 |

* cited by examiner

Primary Examiner—Andrew Schechter
(74) Attorney, Agent, or Firm—Blakely, Sokoloff, Taylor & Zafman LLP

(57) ABSTRACT

A method for fabricating a microelectronic image projection device. One or more nitride dams are formed upon the substrate of the device surrounding the active pixel area. The nitride dams help to contain the liquid crystal and confine the epoxy sealant. In alternative embodiments one or more nitride pillars are formed on the substrate to support the cover glass and maintain the distance between the cover glass and the active pixel area of the substrate. The nitride dams and pillars may be formed on the substrate through an ion implantation method in which HDP nitride is implanted with, for example, silicon ions. The ion implantation causes those areas of the nitride that are implanted with ions to etch more slowly than those areas that are not implanted with ions. This etch rate differential allows formation of the nitride formations with a non-contact single mask etching process.

7 Claims, 5 Drawing Sheets

METHOD FOR FABRICATING A MOAT AROUND AN ACTIVE PIXEL AREA OF A MICROELECTRONIC IMAGE PROJECTION DEVICE

FIELD

Embodiments of the invention relate generally to the field of microelectronic image projection device fabrication and more specifically to fabricating structures on such devices.

BACKGROUND

The operation of some typical microelectronic image projection devices (MIPDs) is based upon the optical properties of liquid crystal in the presence or absence of an electric field. The orientation of the liquid crystal, which may be varied with an applied electric field, is used to modulate reflected light. The use of liquid crystal leads to several fabrication considerations, including containment of the liquid crystal.

FIGS. 1A and 1B illustrate a side view and top view, respectively, of a MIPD using liquid crystal in accordance with the prior art. MIPD 100 as shown in FIG. 1A includes a substrate 105 having an active area 106. The active area 106 comprises the pixels of the MIPD 100. The active area 106 is covered by liquid crystal 110. MIPD 100 also includes a cover glass 115 that seals the liquid crystal 110 from the environment and prevents the liquid crystal from spilling. The liquid crystal is encapsulated between the substrate 105 and the cover glass 115. The device operates by varying the electric potential between the pixels of active area 106 and the cover glass 115. Light incident upon the cover glass 115 is modulated and reflected by the liquid crystal 110. The modulation depends upon the orientation of the liquid crystal molecules, which can be adjusted by varying the potential between the cover glass 115 and the pixels of active area 106.

As shown in the top view of FIG. 1B, MIPD 100 also includes glass (silica) beads 111 randomly dispersed across the surface of substrate 105 covered by cover glass 115. The glass beads 111 are introduced to keep the cover glass 115, which is quite thin, from sagging and thereby maintain the distance between cover glass 115 and active area 106. Typically glass beads 111 are randomly sprayed between the cover glass 115 and the active area 106.

In order to keep the cover glass 115 fixed atop the liquid crystal 110 and to prevent the liquid crystal from spreading beyond the active area 106, an epoxy barrier 120 is typically used. The epoxy barrier 120 is typically deposited as a bead along the perimeter of the active area 106.

The typical fabrication method of a MIPD has several disadvantages. One disadvantage of the randomly dispersed glass beads 111 is that the glass beads 111 can stick together and can detrimentally affect image quality of the MIPD if they happen to land on the pixels of active area 106. Moreover, the random dispersal does not guarantee that the glass beads will provide the intended support.

A further disadvantage of typical fabrication methods concerns the epoxy barrier 120 used to contain the liquid crystal 110. The epoxy tends to spread out into some arbitrary shape as shown in the top view of FIG. 1B. This affects the distance between the cover glass 115 and the active area 106. This spreading also increases the dimensions of the substrate 105 necessary to fabricate the device because the spreading epoxy covers a significant portion of the substrate. This is particularly problematic in devices in which the epoxy bead is relatively large compared to the active area of the device. This can result in lower yield. This disadvantage has greater impact due to the small size of the MIPD as well as the proximity of the active area to an input/output area 125 used to connect the MIPD to a device package.

DESCRIPTION OF THE DRAWINGS

The invention may be best understood by referring to the following description and accompanying drawings that are used to illustrate embodiments of the invention. In the drawings.

DETAILED DESCRIPTION

Embodiments of the invention provide microelectronic image projection devices and methods for fabricating the same. For one embodiment a nitride structure (dam) is formed on the substrate of an articulated semiconductor device to confine and seal the liquid crystal. For one embodiment, two or more concentric nitride dams form a moat to contain and define a sealant (e.g., epoxy) and help to prevent the sealant from spreading. For one embodiment an epoxy moat is thinner than prior art epoxy beads and defines a well-defined and relatively narrow epoxy bead. Additionally, or alternatively an embodiment of the invention contains nitride spacers to prevent a cover glass from sagging and to help control the distance between the cover glass and the active area of a substrate. For one embodiment, the nitride formations are constructed using a conventional lithographic etching process. In an alternative embodiment, the nitride formations are constructed using an ion implantation method to effect the etching rate of the nitride.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1A:
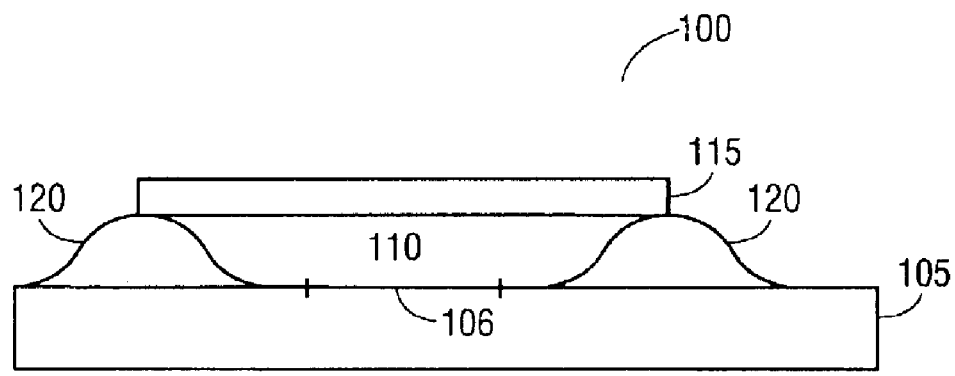
FIGS. 1A and 1B illustrate a side view and top view, respectively, of a microelectronic image projection device (MIPD) using liquid crystal in accordance with the prior art.
Figure 1B:
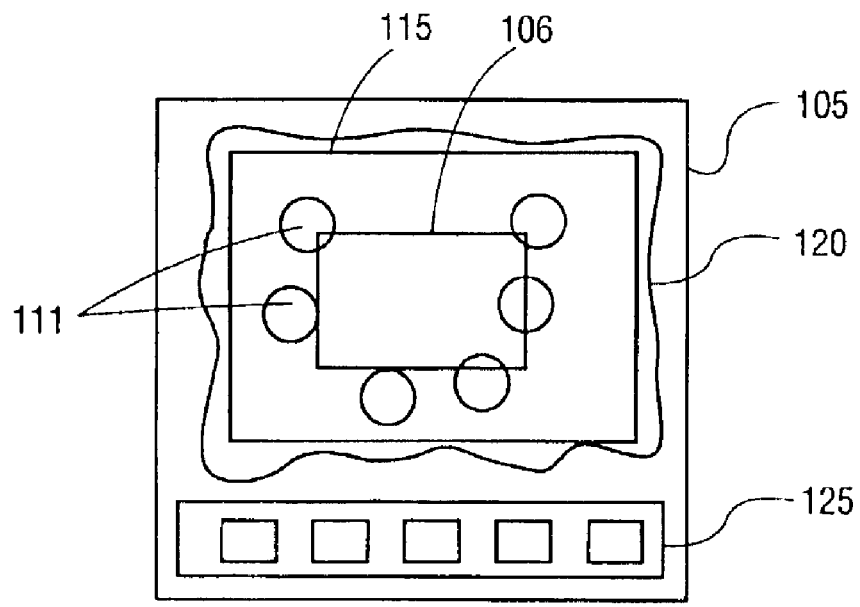
Figure 2:
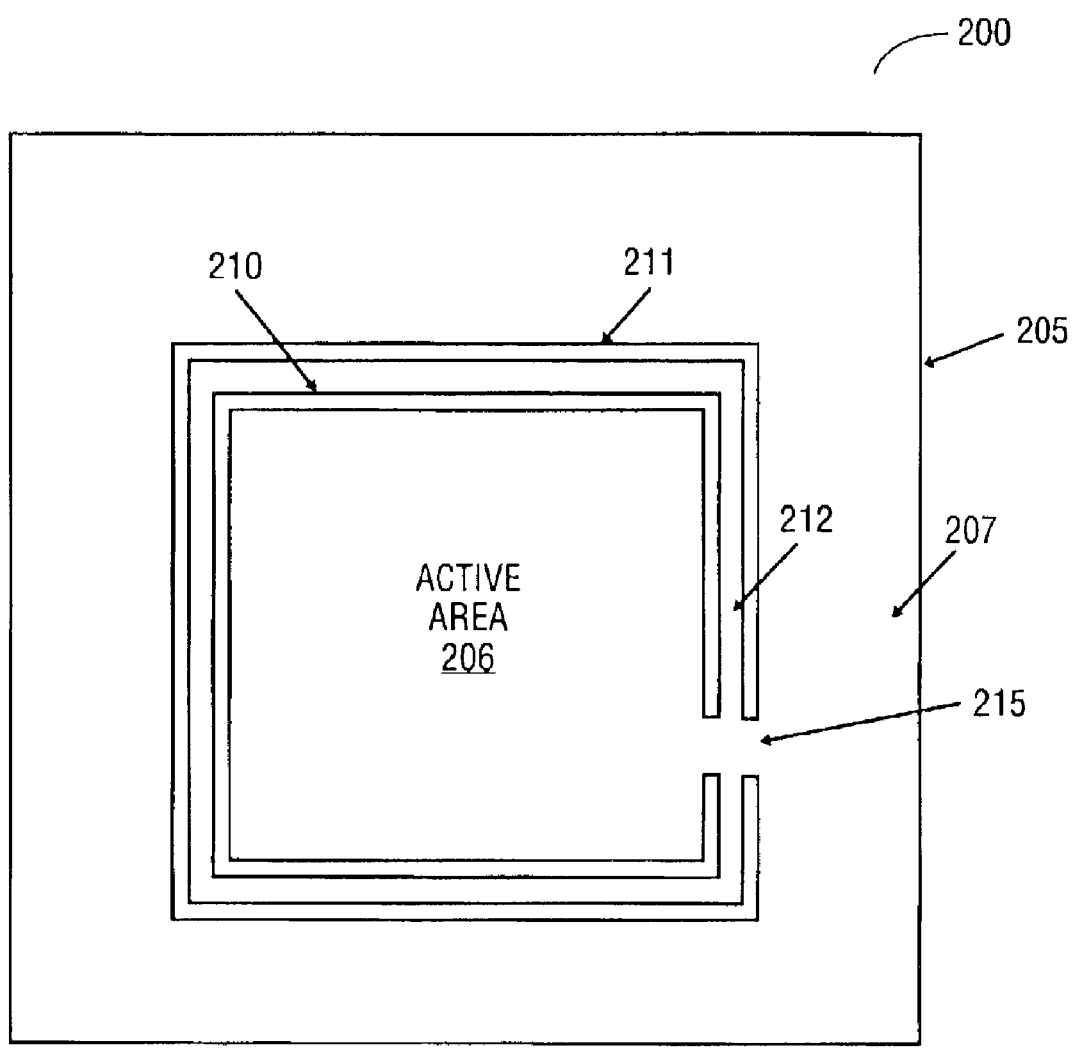
FIG. 2 illustrates a top view of a MIPD having nitride formations used to contain and define an epoxy bead in accordance with one embodiment of the invention.

FIG. 2 illustrates a top view of a MIPD having nitride formations used to contain and define an epoxy bead in accordance with one embodiment of the invention. MIPD 200 includes a substrate 205 having an active pixel area 206 and an inactive area 207. Formed upon substrate 205 are chemical vapor deposition (CVC) HDP nitride formations 210 and 211. Nitride formation 210 surrounds active pixel area 206. Nitride formation 211 surrounds nitride formation 210. The area between nitride formation 210 and nitride formation 211 defines an epoxy moat 212. Nitride formations 210 and 211 contain an inlet (opening) 215 through which liquid crystal may be introduced onto the active pixel area 206, after which the inlet 215 may be sealed with epoxy. The nitride formations 210 and 211 are formed to a specified height depending upon the desired distance between the cover glass and the active pixel area 206 of substrate 205. The nitride formations 210 and 211 contain the epoxy and keep it from spreading onto active pixel area 206.

For one embodiment, nitride formations 210 and 211 are constructed by depositing a layer of, for example oxynitride, and subjecting the oxynitride layer to a conventional lithographic etching process. In an alternative embodiment, the nitride formations 210 and 211 are constructed be depositing a layer of, for example, CVC HDP nitride, and implanting the HDP nitride with, for example, silicon atoms as described more fully below in reference to FIG. 4.

Figure 3:
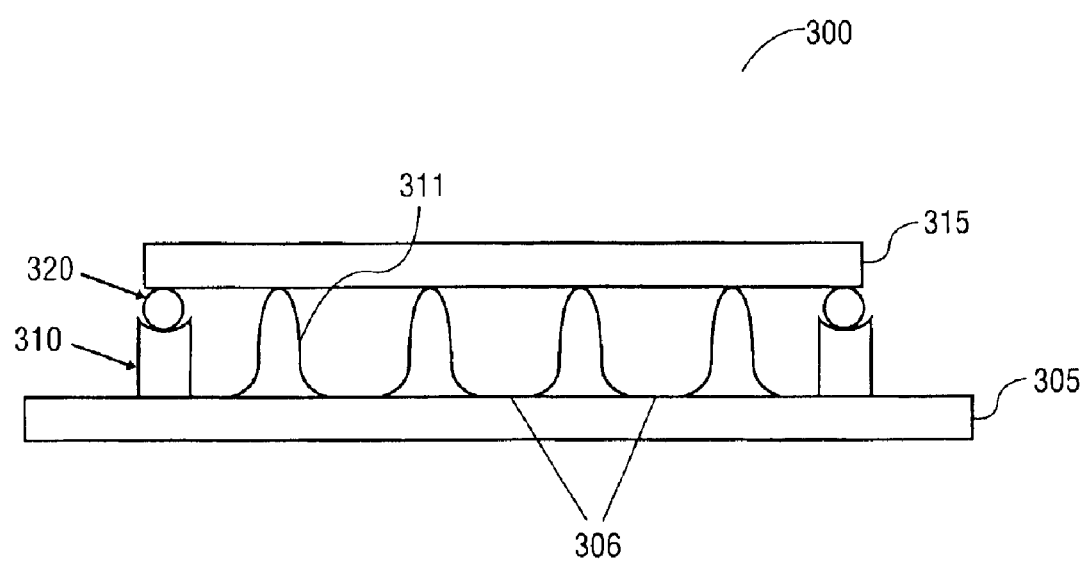
FIG. 3 illustrates a side view of a MIPD having nitride formations used to support the cover glass and maintain a specified distance between the cover glass and the substrate in accordance with one embodiment of the invention.

FIG. 3 illustrates a side view of a MIPD having nitride formations used to support the cover glass and maintain a specified distance between the cover glass and the substrate in accordance with one embodiment of the invention. MIPD 300 includes substrate 305, having an active pixel area 306, and cover glass 315. Formed upon substrate 305 is a nitride formation 310 that acts as a dam to help confine the liquid crystal, not shown. Nitride formation 310 also contains and defines the sealant, for example, epoxy bead 320. The epoxy bead 320 helps to retain the cover glass in place and seals the liquid crystal over active pixel area 306. Also formed upon substrate 305 are one or more nitride pillars 311 to help support the cover glass 315 and also to help keep the cover glass the desired distance from the substrate 305. The height of the nitride pillars 311 can be more accurately controlled than the silica beads of the prior art.

An embodiment of the invention takes advantage of the discovery that ion-implanted HDP nitride etches at a slower rate than HDP nitride that has not been implanted with ions. For one embodiment in which HDP nitride is implanted with silicon ions, the etch rate ratio is approximately 1:1.8 for silicon ion-implanted HDP nitride compared with HDP nitride that has not been implanted with silicon ions. The formation of a nitride dam can be affected by selectively implanting portions of an HDP silicon nitride layer with silicon ions. The implantation of selected portions is accomplished using a masking process. The implantation of silicon atoms reduces the etch rate of the HDP nitride layer for those portions implanted, thus producing a dam structure upon etching.

Figure 4:
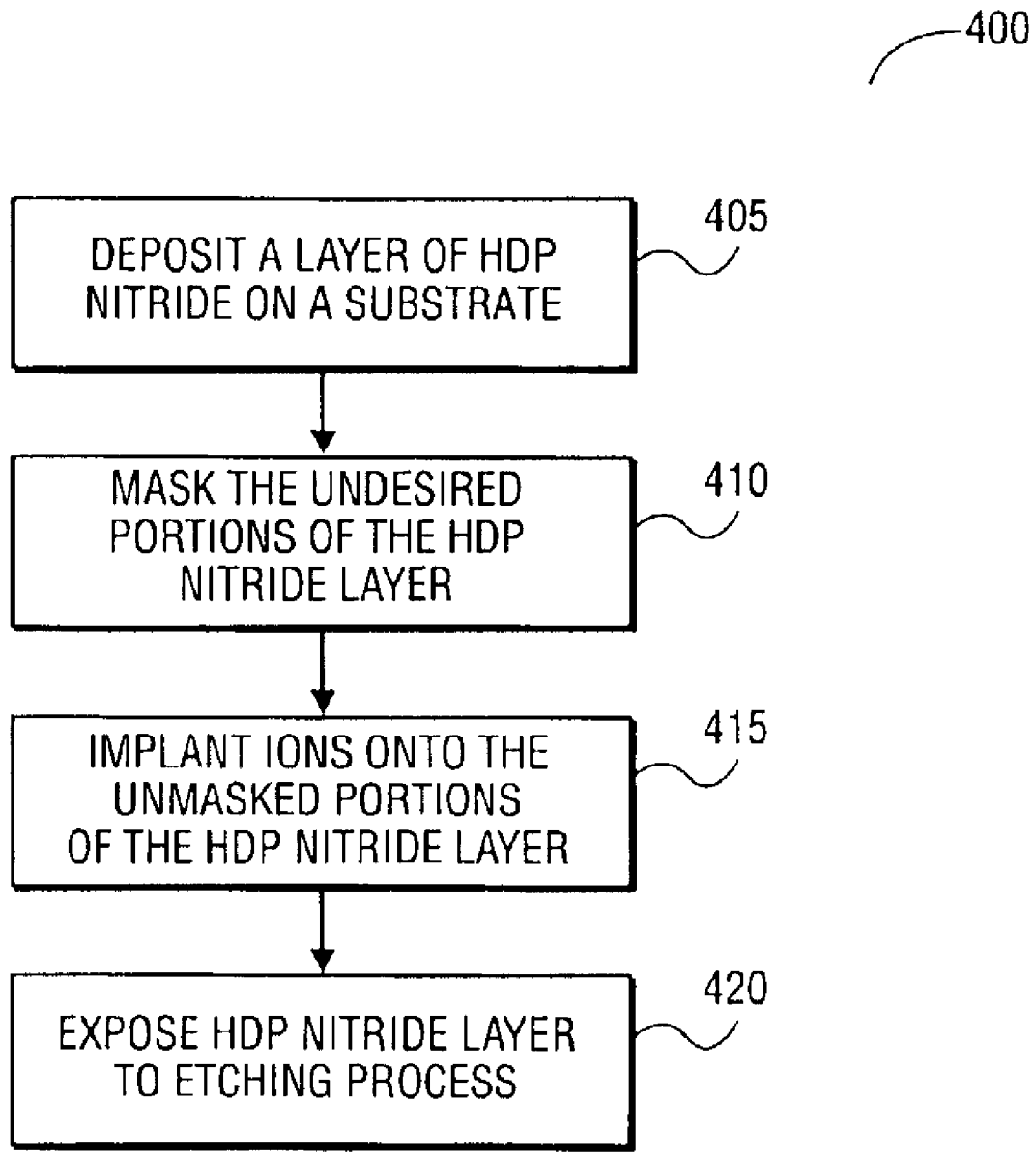
FIG. 4 illustrates a process in which a nitride dam structure is formed upon a substrate using ion implantation in accordance with one embodiment of the invention.

FIG. 4 illustrates a process in which a nitride dam structure is formed upon a substrate using ion implantation in accordance with one embodiment of the invention. Process 400, shown in FIG. 4 begins with operation 405 in which a layer of HDP nitride is deposited upon a substrate. The thickness of the HDP nitride layer is selected depending upon the desired height of the dam structure as further described below.

At operation 410 a mask is deposited over those portions of the HDP nitride layer that are not part of the dam structure.

At operation 415 ions, for example, silicon ions are implanted into the HDP nitride layer. The mask deposited at operation 410 allows ion implantation of only those portions of the HDP nitride layer that will comprise the dam structure.

At operation 420 the HDP nitride layer is exposed to a dry etching process (e.g., plasma etching). Those areas of the HDP nitride layer that were not implanted with silicon ions etch 1.8 times faster than the implanted areas, thereby allowing the formation of a dam structure as illustrated below in FIGS. 5A and 5B. Because such an embodiment allows for a non-contact single mask process etching process, it is easier and more reliable than the typical wet etching of conventional processes.

Figure 5A:
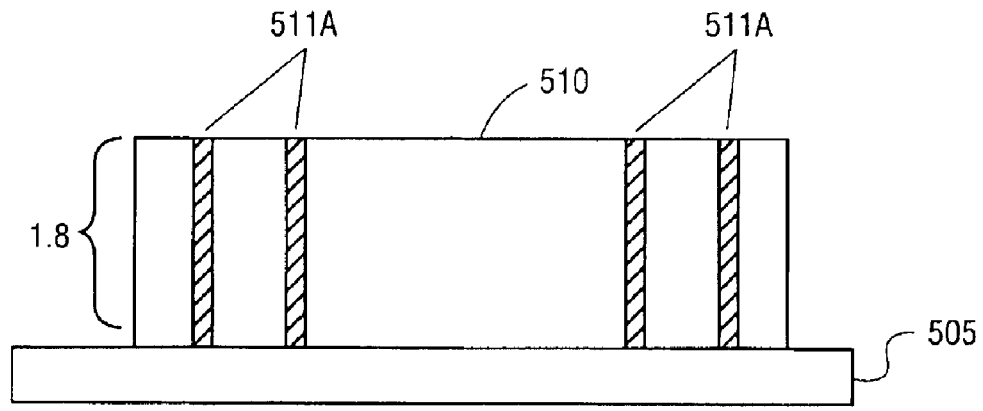
FIGS. 5A and 5B illustrate the formation of a HDP nitride dam structure upon a substrate using ion implantation in accordance with one embodiment.
Figure 5B:
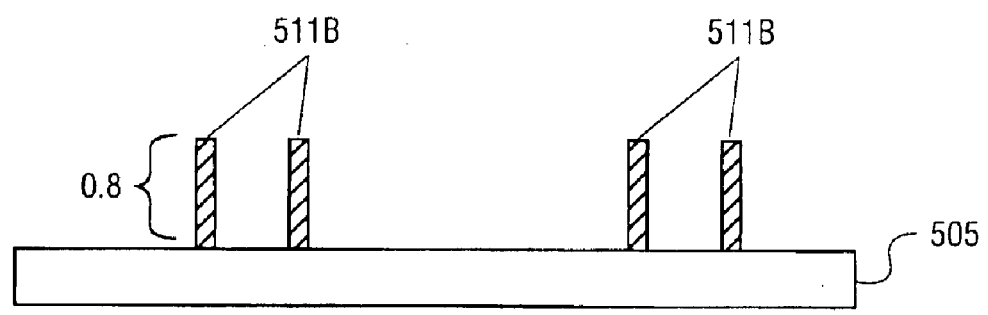

FIGS. 5A and 5B illustrate the formation of a HDP nitride dam structure upon a substrate using ion implantation in accordance with one embodiment. FIG. 5A incldes a substrate 505 having a layer of HDP nitride 510 deposited thereon. For purposes of illustration, the thickness of the HDP nitride layer is 1.8 cm. HDP nitride layer 510 has been implanted with silicon ions in selected areas 511A.

In FIG. 5B, after a dry etching process, for example as described above in reference to FIG. 4, the entire HDP nitride layer has been removed in areas not implanted with silicon ions. In selected areas 511B, approximately 0.8 cm of the 1.8 cm HDP nitride layer remains forming the dam structure. The dam structure, which will confine the liquid crystal and contain and define the epoxy bead, is relatively thin and well defined.

General Matters

Embodiments of the present invention provide MIPDs having nitride formations that contain and define the epoxy seal to help prevent the epoxy from running. Embodiments of the present invention also provide MIPDs having nitride formations that help support the cover glass and help maintain the distance between the cover glass and the active pixel area of the substrate. The nitride formations in accordance with various embodiments of the invention may be formed using conventional lithographic etching processes or using the ion implantation technique disclosed herein. Embodiments of the invention employing the ion implantation process have been described in which HDP nitride is implanted with silicon ions. In alternative embodiments, the nitride may be implanted with other ions such as germanium, boron, or arsenic.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:

depositing a layer of HDP nitride upon a substrate, the substrate having an active pixel area;

implanting ions into selected portions of the HDP nitride layer, the selected portions defining one or more dams;

etching the HDP nitride layer such that non-selected portions of the HDP nitride layer are removed and such that some of the selected portions of the HDP nitride layer remain forming the one or more dams, one or more of the dams surrounding the active pixel area; and placing a liquid on the active pixel area such that the one or more dams help to contain the liquid.

2. The method of claim 1, wherein the liquid is a liquid crystal.

3. The method of claim 1, further comprising:

depositing a sealant around the active pixel area, the sealant confined by one or more the dams; and placing a cover glass over the active pixel area, the sealant sealing the cover glass to the substrate.

4. The method of claim 3, wherein the sealant is an epoxy bead.

5. The method of claim 1, wherein the selected portions further define one or more pillars, the pillars helping to support a cover glass.

6. The method of claim 1, wherein ion implantation into non-selected portions of the HDP nitride layer is avoided through a masking process.

7. The method of claim 1, wherein the ions are selected from the group including silicon ions, boron ions, arsenic ions, and germanium ions.

* * * * *